US008416232B2

(12) United States Patent
Nam et al.

(10) Patent No.: US 8,416,232 B2
(45) Date of Patent: Apr. 9, 2013

(54) LIQUID CRYSTAL DISPLAY CAPABLE OF REDUCING NUMBER OF OUTPUT CHANNELS OF DATA DRIVING CIRCUIT AND PREVENTING DEGRADATION OF PICTURE QUALITY

(75) Inventors: Hyuntaek Nam, Daegu (KR); Myungkook Moon, Daegu (KR); Jongwoo Kim, Gumi-si (KR)

(73) Assignee: LG Display Co. Ltd., Seoul (KR)

( * ) Notice: Subject to any disclaimer, the term of this patent is extended or adjusted under 35 U.S.C. 154(b) by 636 days.

(21) Appl. No.: 12/558,198

(22) Filed: Sep. 11, 2009

(65) Prior Publication Data

US 2010/0149151 A1 Jun. 17, 2010

(30) Foreign Application Priority Data

Dec. 17, 2008 (KR) ........................ 10-2008-0128823

(51) Int. Cl.
*G06F 3/038* (2006.01)
*G09G 5/00* (2006.01)
*G09G 3/36* (2006.01)

(52) U.S. Cl. ........................... 345/213; 345/92; 345/211

(58) Field of Classification Search ........................ None
See application file for complete search history.

(56) References Cited

U.S. PATENT DOCUMENTS

| | | | | |
|---|---|---|---|---|
| 6,680,722 | B1 * | 1/2004 | Hiraki et al. | 345/96 |
| 7,864,192 | B2 * | 1/2011 | Kim et al. | 345/596 |
| 2009/0310077 | A1 * | 12/2009 | Kim et al. | 349/151 |

FOREIGN PATENT DOCUMENTS

| | | | |
|---|---|---|---|
| JP | 7334131 | A | 12/1995 |
| JP | 8069264 | A | 3/1996 |
| JP | 11095725 | A | 4/1999 |
| JP | 2000131666 | A | 5/2000 |
| JP | 2000235375 | A | 8/2000 |
| JP | 2001174783 | A | 6/2001 |
| JP | 2005157280 | A | 6/2005 |
| JP | 2005242359 | A | 9/2005 |
| JP | 2006350289 | A | 12/2006 |
| JP | 2008170993 | A | 7/2008 |

OTHER PUBLICATIONS

Office Action issued in corresponding Japanese Patent Application No. 2009-256822, mailed Jan. 23, 2012.

* cited by examiner

*Primary Examiner* — Daniell L Negron
(74) *Attorney, Agent, or Firm* — Brinks Hofer Gilson & Lione

(57) ABSTRACT

A liquid crystal display is provided. The liquid crystal display includes a liquid crystal display panel, a data driving circuit for converting digital video data into positive/negative data voltages to be supplied to the data lines and adjusting the horizontal polarity inversion cycle of the positive/negative data voltages, and a timing controller for generating the vertical polarity control signal and the horizontal polarity control signal, adding a FRC correction value to input digital video data to supply the input digital video data to the data driving circuit, detecting a predetermined weak pattern from the input digital video data and, when data having the weak pattern is detected, changing either the logic inversion cycle of the vertical polarity control signal or the logic of the horizontal polarity control signal and changing the position of the data to which the FRC correction value is added.

6 Claims, 10 Drawing Sheets

FIG. 11

<table>
<tr><th colspan="2">Input Pattern</th><th>Normal</th><th>Shut Down</th><th>Smear</th></tr>
<tr><td rowspan="3">@TCON</td><td>POL</td><td>V2Dot</td><td>V4Dot</td><td>V2Dot</td></tr>
<tr><td>HINV</td><td>H1Dot</td><td>H1Dot</td><td>H2Dot</td></tr>
<tr><td>FRC</td><td>FRC1</td><td>FRC2</td><td>FRC3</td></tr>
<tr><td rowspan="2">@PANEL</td><td>POLARITY CONTROL</td><td>V1Dot<br>H2Dot</td><td>V2Dot<br>H2Dot</td><td>V1Dot<br>H4Dot</td></tr>
<tr><td>POLARITY PATTERN</td>
<td><table>
<tr><td>−</td><td>−</td><td>+</td><td>+</td><td>−</td><td>−</td><td>+</td><td>+</td></tr>
<tr><td>+</td><td>+</td><td>−</td><td>−</td><td>+</td><td>+</td><td>−</td><td>−</td></tr>
<tr><td>−</td><td>−</td><td>+</td><td>+</td><td>−</td><td>−</td><td>+</td><td>+</td></tr>
<tr><td>+</td><td>+</td><td>−</td><td>−</td><td>+</td><td>+</td><td>−</td><td>−</td></tr>
<tr><td>−</td><td>−</td><td>+</td><td>+</td><td>−</td><td>−</td><td>+</td><td>+</td></tr>
<tr><td>+</td><td>+</td><td>−</td><td>−</td><td>+</td><td>+</td><td>−</td><td>−</td></tr>
<tr><td>−</td><td>−</td><td>+</td><td>+</td><td>−</td><td>−</td><td>+</td><td>+</td></tr>
<tr><td>+</td><td>+</td><td>−</td><td>−</td><td>+</td><td>+</td><td>−</td><td>−</td></tr>
</table></td>
<td><table>
<tr><td>−</td><td>−</td><td>+</td><td>+</td><td>−</td><td>−</td><td>+</td><td>+</td></tr>
<tr><td>+</td><td>+</td><td>−</td><td>−</td><td>+</td><td>+</td><td>−</td><td>−</td></tr>
<tr><td>+</td><td>+</td><td>−</td><td>−</td><td>+</td><td>+</td><td>−</td><td>−</td></tr>
<tr><td>−</td><td>−</td><td>+</td><td>+</td><td>−</td><td>−</td><td>+</td><td>+</td></tr>
<tr><td>−</td><td>−</td><td>+</td><td>+</td><td>−</td><td>−</td><td>+</td><td>+</td></tr>
<tr><td>+</td><td>+</td><td>−</td><td>−</td><td>+</td><td>+</td><td>−</td><td>−</td></tr>
<tr><td>+</td><td>+</td><td>−</td><td>−</td><td>+</td><td>+</td><td>−</td><td>−</td></tr>
<tr><td>−</td><td>−</td><td>+</td><td>+</td><td>−</td><td>−</td><td>+</td><td>+</td></tr>
</table></td>
<td><table>
<tr><td>+</td><td>+</td><td>−</td><td>−</td><td>−</td><td>−</td><td>+</td><td>+</td></tr>
<tr><td>−</td><td>−</td><td>+</td><td>+</td><td>+</td><td>+</td><td>−</td><td>−</td></tr>
<tr><td>+</td><td>+</td><td>−</td><td>−</td><td>−</td><td>−</td><td>+</td><td>+</td></tr>
<tr><td>−</td><td>−</td><td>+</td><td>+</td><td>+</td><td>+</td><td>−</td><td>−</td></tr>
<tr><td>+</td><td>+</td><td>−</td><td>−</td><td>−</td><td>−</td><td>+</td><td>+</td></tr>
<tr><td>−</td><td>−</td><td>+</td><td>+</td><td>+</td><td>+</td><td>−</td><td>−</td></tr>
<tr><td>+</td><td>+</td><td>−</td><td>−</td><td>−</td><td>−</td><td>+</td><td>+</td></tr>
<tr><td>−</td><td>−</td><td>+</td><td>+</td><td>+</td><td>+</td><td>−</td><td>−</td></tr>
</table></td></tr>
</table>

LIQUID CRYSTAL DISPLAY CAPABLE OF REDUCING NUMBER OF OUTPUT CHANNELS OF DATA DRIVING CIRCUIT AND PREVENTING DEGRADATION OF PICTURE QUALITY

RELATED APPLICATIONS

This application claims the benefit of Korea Patent Application No. 10-2008-0128823 filed on Dec. 17, 2008, the entire contents of which is incorporated herein by reference for all purposes as if fully set forth herein.

BACKGROUND

1. Field of the Invention

This document relates to a liquid crystal display.

2. Discussion of the Related Art

An active matrix driving type liquid crystal display displays moving pictures by using a thin film transistor (hereinafter, "TFT") as a switching element. Since such LCDs can be made smaller than cathode ray tubes, they are rapidly replacing the cathode ray tubes in television sets, as well as in displays of mobile information devices, office machines, computers, etc.

Liquid crystal cells of a liquid crystal display picture images by changing transmittance according to a potential difference between a data voltage supplied to a pixel electrode and a common voltage supplied to a common electrode. The liquid crystal display is generally driven in an inversion scheme in which the polarity of a data voltage applied to liquid crystal is periodically inverted in order to prevent deterioration of the liquid crystal. When the liquid crystal display is driven in the inversion scheme, the picture quality of the liquid crystal display may decrease according to a correlation between the polarity of a data voltage to be charged in the liquid crystal cells and the data voltage. This is because either one of the positive and negative polarities of the data voltages charged in the liquid crystal cells becomes a dominant polarity according to the data voltages charged in the liquid crystal cells without balance between the positive and negative polarities, and therefore the common voltage applied to the common electrode is shifted. When the common voltage is shifted, the reference potential of the liquid crystal cells is fluctuated. Thus, the observer can sense flicker or smear in an image displayed on the liquid crystal display.

BRIEF SUMMARY

A liquid crystal display includes: a liquid crystal display panel including a plurality of data lines, a n-number of gate lines crossing the data lines, a plurality of TFTs connected to the crossings of the data lines and the gate lines, and liquid crystal cells connected to the TFTs and arranged in a m×n matrix, wherein the m and n are natural numbers; a data driving circuit for converting digital video data into positive/negative data voltages to be supplied to the data lines in response to a vertical polarity control signal and adjusting the horizontal polarity inversion cycle of the positive/negative data voltages in response to a horizontal polarity control signal; and a timing controller for generating the vertical polarity control signal and the horizontal polarity control signal, adding a FRC correction value to input digital video data to supply the input digital video data to the data driving circuit, detecting a predetermined weak pattern from the input digital video data and, when data having the weak pattern is detected, changing either the logic inversion cycle of the vertical polarity control signal or the logic of the horizontal polarity control signal and changing the position of the data to which the FRC correction value is added.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 11 is a view showing the polarity control signals and FRC patterns that are output from the timing controller according to data input to the timing controller and the polarity patterns of the data voltages of the liquid crystal display panel.

DETAILED DESCRIPTION OF THE DRAWINGS AND THE PRESENTLY PREFERRED EMBODIMENTS

The above and other aspects and features of the present invention will become more apparent by describing exemplary embodiments thereof with reference to the attached drawings.

Hereinafter, an implementation of this disclosure will be described in detail with reference to FIGS. 1 to 11.

Figure 1:
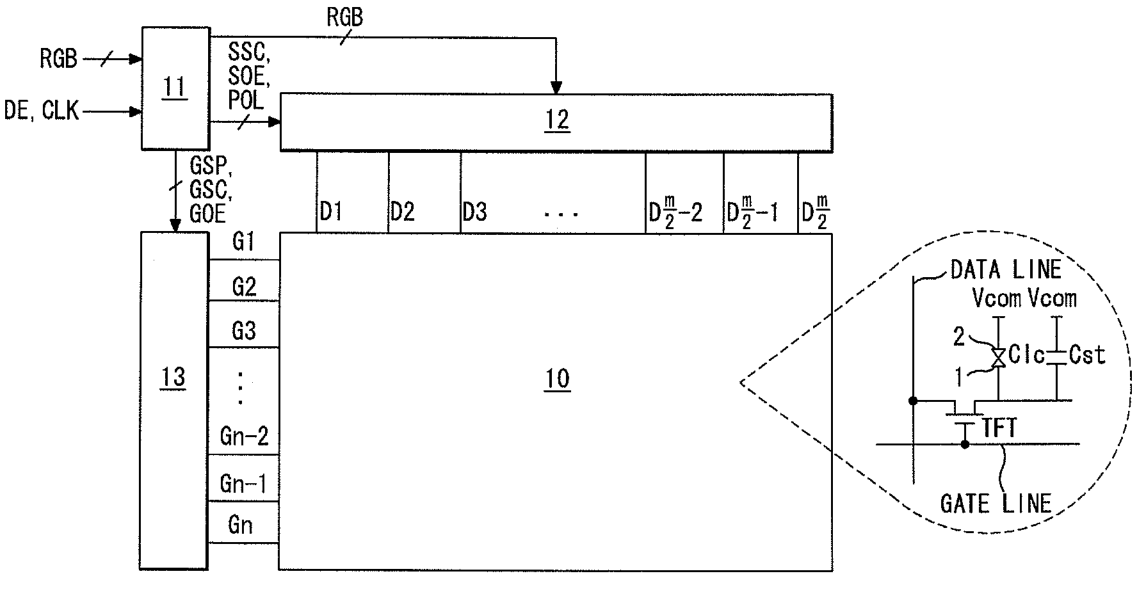
FIG. 1 is a block diagram showing a liquid crystal display according to an exemplary embodiment of the present disclosure.

Referring to FIG. 1, a liquid crystal display according to an exemplary embodiment of the present disclosure includes a liquid crystal display panel 10, a timing controller 11, a data driving circuit 12, and a gate driving circuit 13. The data driving circuit 12 includes a plurality of source drive integrated circuits (ICs). The gate driving circuit 13 includes a plurality of gate drive ICs.

In the liquid crystal panel 10, a liquid crystal layer is formed between two glass substrates. The liquid crystal panel 10 includes a m×n number of liquid crystal cells Clc disposed in a matrix array at each crossing of data lines D1 to Dm (m: natural number) and gate lines G1 to Gn (n: natural number).

On the lower glass substrate of the liquid crystal panel 10, a pixel array including data lines D1 to Dm, gate lines G1 to Gn, thin film transistors (TFTs), storage capacitors Cst, and the like, is formed. The liquid crystal cells Clc are connected to the TFTs and driven by electric fields between pixel electrodes 1 and common electrodes 2. Black matrixes, color filters, and common electrodes 2 are formed on the upper glass substrate of the liquid crystal panel 10.

The common electrodes 2 are formed on the upper glass substrate to implement a vertical electric field driving method, such as a twisted nematic (TN) mode or a vertical alignment (VA) mode, and formed on the lower glass substrate together with the pixel electrodes 1 to implement a horizontal electric field driving method, such as an in-plane switching (IPS) mode or a fringe field switching (FFS) mode.

Polarizers are attached on the upper and lower glass substrates of the liquid crystal panel 10, and alignment films are formed thereon to set a pre-tilt angle for the liquid crystal.

The liquid crystal mode of the liquid crystal display panel 10 applicable in the present invention may be implemented as any liquid crystal mode, as well as the above-stated TN mode, VA mode, IPS mode, and FFS mode. Moreover, the liquid crystal display of the present invention may be implemented in any form including a transmissive liquid crystal display, a semi-transmissive liquid crystal display, and a reflective liquid crystal display. The transmissive liquid crystal display and the semi-transmissive liquid crystal display require a backlight unit that is omitted in the drawings.

Figure 3:
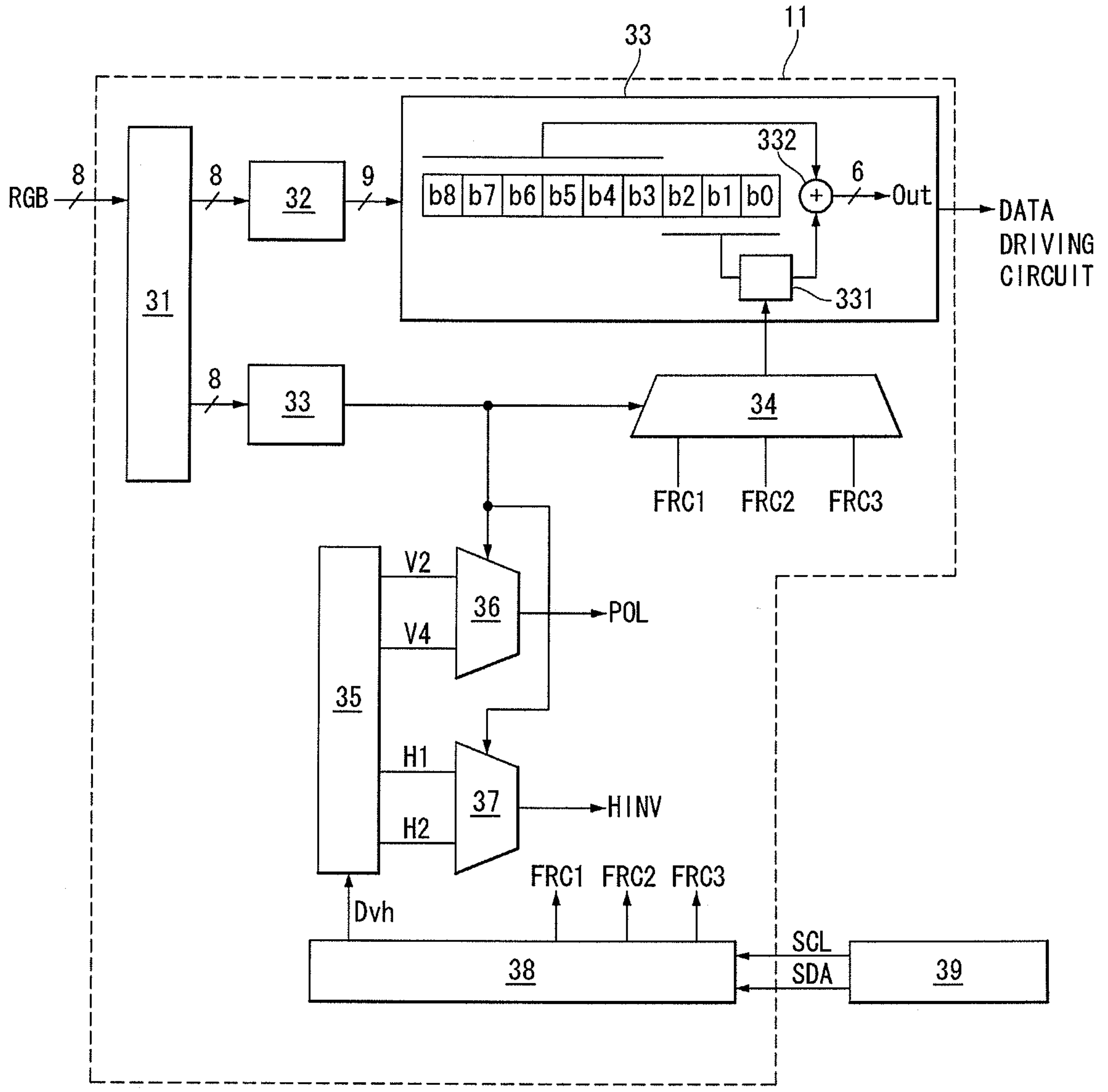
FIG. 3 is a circuit diagram showing in detail the circuit configuration of a data processing part of a timing controller.

The timing controller 11 reduces the number of bits of input digital video data RGB supplied to the data driving circuit 12 by expanding the gray levels by using frame rate control (FRC). The timing controller 11 generates j-bit digital video data (wherein, j is a natural number less than i) by adding a FRC correction value to i-bit input data video data (wherein, i is a natural number of 6 or more), and supplies the j-bit digital video data to the data driving circuit 12 in a mini low-voltage differential signaling (LVDS) method. Although an example of FIG. 3 illustrates a case where i is '8' and j is '6', the present invention is not limited thereto but includes any method that supplies the data driving circuit with data having a smaller number of bits than that of input digital video data without a reduction of the number of gray levels by applying the FRC.

The timing controller 11 detects input data having a weak pattern of which picture quality can be reduced in a normal inversion scheme by analyzing input digital video data (RGB). The timing controller 11 changes a FRC pattern for adding a FRC correction value of the weak pattern data supplied to the data driving circuit 12 in order to prevent degradation of the picture quality of the input data having the weak pattern, and changes the inversion scheme of a data voltage supplied to the liquid crystal display panel 10 by changing control signals POL and HINV for controlling the polarity inversion operation of the data driving circuit 12. Although the normal inversion scheme is an inversion scheme that offers the best picture quality in most input data other than weak pattern data, this may cause deterioration of picture quality in weak pattern data.

The timing controller generates control signals for controlling the data driving circuit 12 and the gate driving circuit 13 by using timing signals, such as vertical/horizontal synchronous signals Vsync and Hsync, a data enable signal DE, a dot clock signal CLK, etc. The control signals generated by the timing controller 11 include a gate timing control signal for controlling the operation timing of the gate driving circuit 12 and a source timing control signal for controlling the operation timing of the data driving circuit 21 and the polarity of a data voltage.

The gate timing control signals include a gate start pulse GSP, a gate shift clock signal GSC, a gate output enable signal GOE, etc. The gate start pulse GSP is applied to the first gate drive IC for generating a first gate pulse (or scan pulse). The gate shift clock GSC is commonly input to the gate drive ICs to shift the gate start pulse GSP. The gate output enable signal GOE controls an output from the gate drive ICs.

The data timing control signals include a source start pulse SSP, a source sampling clock SSC, a vertical polarity control signal POL, a horizontal polarity control signal HINV, a source output enable signal SOE, etc. The source start pulse SSP controls a data sampling start point of the data driving circuit 12. The source sampling clock SSC is a clock signal that controls a data sampling operation in the data driving circuit 12 based on a rising or falling edge. The vertical polarity control signal POL controls the vertical polarity of a data voltage output from the data driving circuit 12. The horizontal polarity control signal HINV controls the horizontal polarity of a data voltage output from the data driving circuit 12. The source output enable signal SOE controls the output of the data driving circuit 12. If digital video data and a mini LVDS clock are transmitted between the timing controller 11 and the data driving circuit 12 in accordance with a mini LVDS scheme, a first clock generated after a reset signal of the mini LVDS clock serves as a start pulse. Thus, the source start pulse SSP may be omitted.

The data driving circuit 12 samples and latches digital video data RGB serially input from the timing controller 11 to convert the digital video data of a serial data transmission system into digital video data RGB of a parallel data transmission system. The data driving circuit 12 converts the digital video data RGB converted to adapted to the parallel data transmission system into positive/negative analog video data voltages in response to the vertical and horizontal polarity control signals POL and HINV, and supplies it to the data lines DL in response to the source output enable signal SOE.

The gate driving circuit 13 sequentially supplies gate pulses (or scan pulses) to the gate lines G1 to Gn in response to the gate timing control signals GSP, GSS, and GOE.

Figure 2:
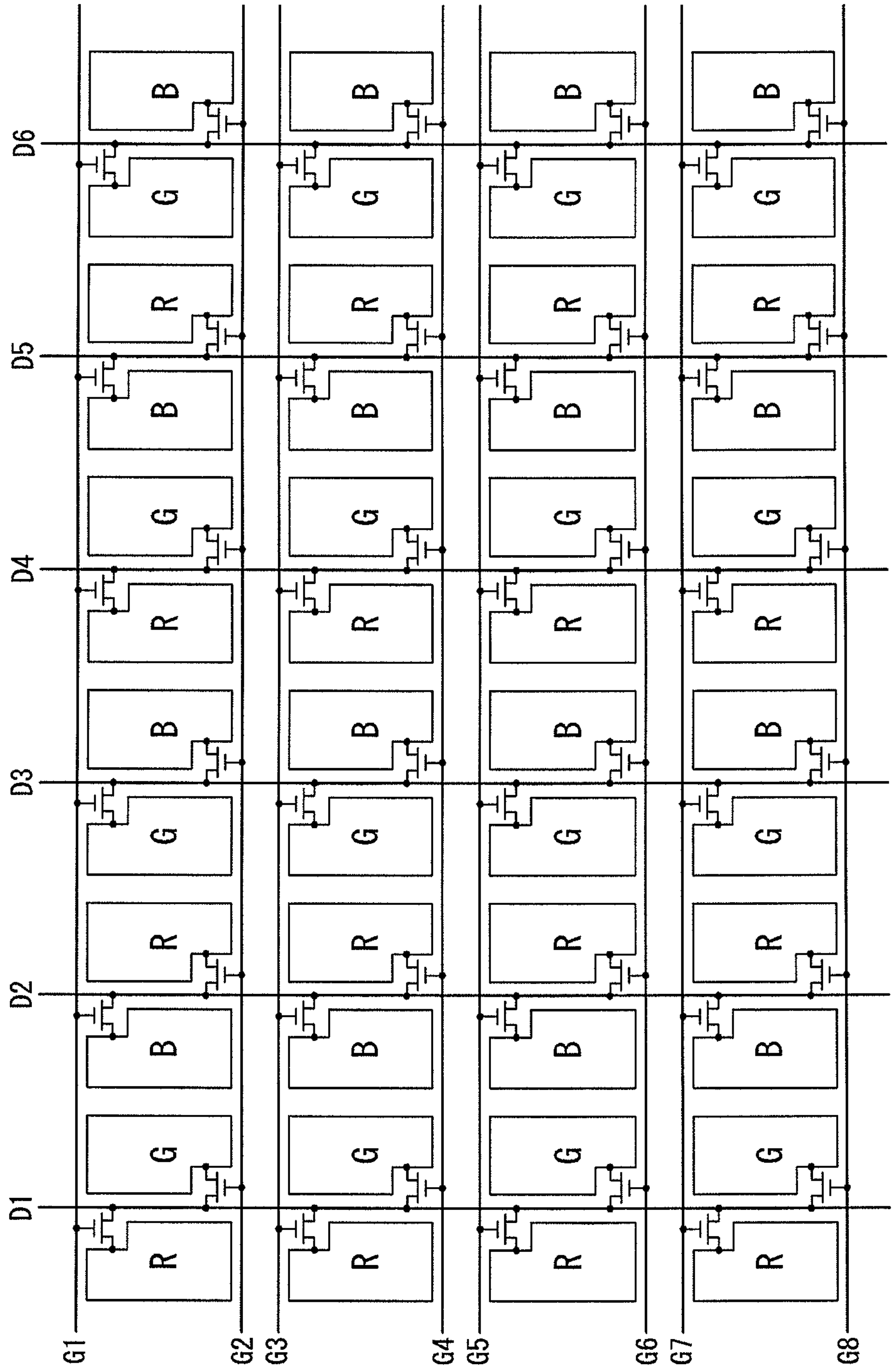
FIG. 2 is an equivalent circuit diagram showing a portion of a pixel array of a liquid crystal display panel shown in FIG. 1.

FIG. 2 is an equivalent circuit diagram showing a portion of a pixel array of a liquid crystal display panel shown in FIG. 1.

Referring to FIG. 2, the pixel array of the liquid crystal display panel 10 includes data lines D1 to D6, gate lines G1 to G8, and TFTs formed at the crossings of the data lines D1 to D6 and the gate lines G1 to G8.

The data lines D1 to D6 are supplied with data voltages from the data driving circuit 12. The left and right neighboring liquid crystal cells are time-divisionally charged with the data voltages supplied via one data line D1 to D6. Since the data voltages to be supplied to the left and right neighboring liquid crystal cells are supplied via one data line D1 to D6, the required number of output channels of the data driving circuit 12 is m/2, that is ½ less than the horizontal resolution m of the liquid crystal cells.

During a first horizontal period, the data driving circuit 12 supplies a red data voltage R to (3k+1)th data lines D1 and D4 (k is a positive integer), a blue data voltage B to a (3k+2)th data lines D2 and D5, and a green data voltage G to (3k+3)th data lines D3 and D6. During a second horizontal period, the data driving circuit 12 supplies a green data voltage G to the (3k+1)th data lines D1 and D4, a red data voltage R to the (3k+2)th data lines D2 and D5, and a blue data voltage B to the (3k+3)th data lines D3 and D6.

The gate lines G1 to G8 are supplied with gate pulses for turning on the TFTs. The gate driving circuit 13 sequentially supplies odd-numbered gate lines G1, G3, G5, and G7 with gate pulses synchronized with the red data voltage R supplied to the (3k+1)th data lines D1 and D4, the blue data voltage B supplied to the (3k+2)th data lines D2 and D5, and the green data voltage G supplied to the (3k+3)th data lines D3 and D6. Also, the gate driving circuit 13 sequentially supplies even-numbered gate lines G2, G4, G6, and G8 with the green data voltage G supplied to the (3k+1)th data lines D1 and D4, the red data voltage R supplied to the (3k+2)th data lines D2 and D5, and the blue data voltage B supplied to the (3k+3)th data lines D3 and D6.

The TFTs are turned on in response to the gate pulses supplied from the gate lines G1 to G8 to supply the data voltages from the data lines D1 to D6 to the pixel electrodes of the liquid crystal cells.

FIG. 3 is a circuit diagram showing in detail the circuit configuration of a data processing part of the timing controller.

Referring to FIG. 3, the timing controller 11 includes an interface reception unit 31, a bit expansion unit 32, a FRC processing unit 30, an image analysis unit 33, a first selection unit 34, a vertical/horizontal polarity control signal generator 35, a second selection unit 36, a third selection unit 37, and an I2C master 38. The timing controller 11 is connected to an electrically erasable programmable read-only memory (EEPROM) 39 for supplying FRC patterns FRC1 to FRC3 and vertical/horizontal polarity control data Dvh to the I2C master 38.

The interface reception unit 31 receives 8-bit digital video data transmitted according to the LVDS interface standard and supplies it to the bit expansion unit 32 and the image analysis unit 33. The bit expansion unit 32 adds the least significant 3 bits (LSB) to the 8-bit digital video data to expand the 8-bit digital video data to 9-bit digital video data.

The FRC processing unit 30 encodes 3-bit FRC data for generating an intermediate gray level between ⅛ and ⅞ in the LSB 3 bits b0 to b2 of the 9-bit digital video data b0 to b8 input from the bit expansion unit 32, and adds a FRC correction value of '1' to the MSB 6 bits b3 to b8 of pixel data designated by the FRC data. Next, the FRC processing unit 30 supplies 6-bit digital video data b3 to b8 to the data driving circuit 12. To this end, the FRC processing unit 30 includes a FRC selection unit 301 and an adder 302. The FRC selection unit 301 selects pixel data to which a FRC correction value is added from among the FRC patterns FRC1 to FRC3 input from the first selection unit 34 in accordance with the FRC data encoded in the LSB 3 bits b0 to b2 of the 9-bit digital video data. The adder 302 adds a FRC correction value of '1' to the MSB 6 bits of the pixel data selected by the FRC selection unit 301.

Figure 9:
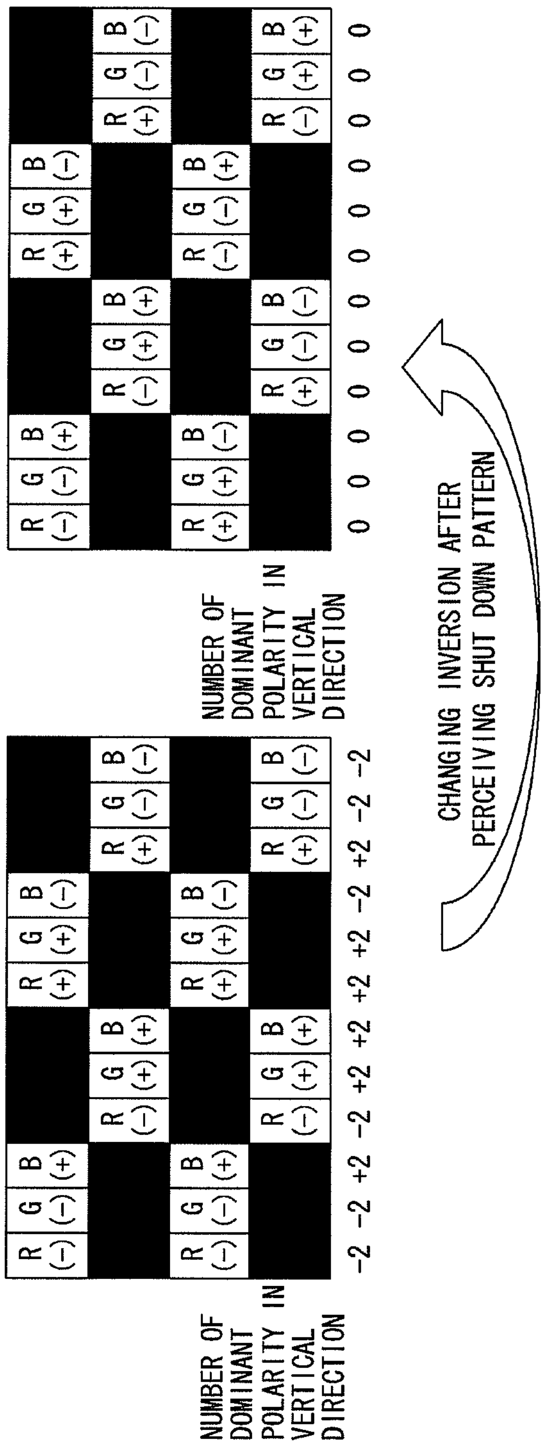
FIG. 9 is a waveform diagram showing changes in the polarity patterns of data voltages supplied to the liquid crystal display panel when a shut-down pattern is input to the timing controller.
Figure 10:
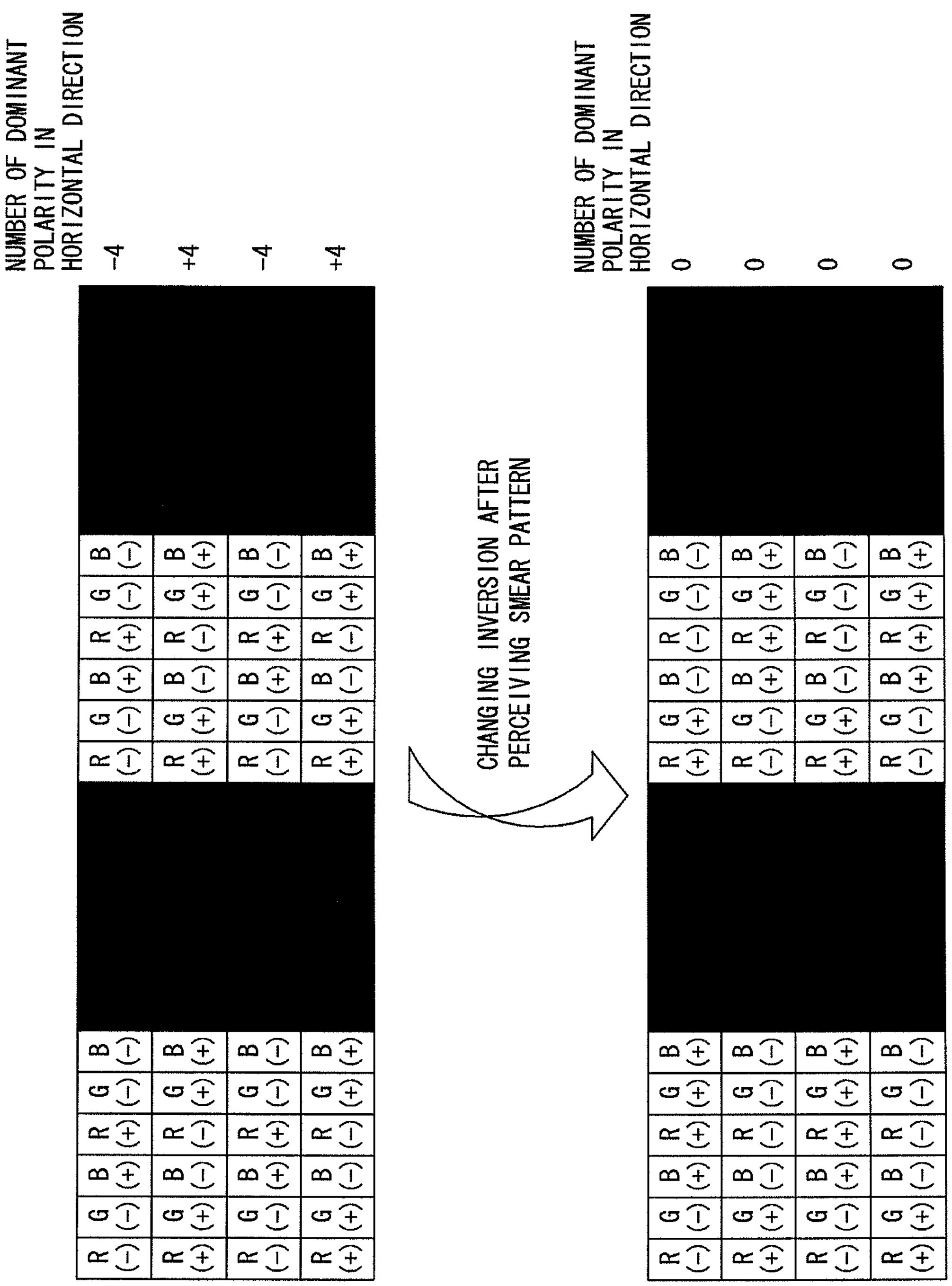
FIG. 10 is a view showing changes in the polarity patterns of data voltages supplied to the liquid crystal display panel when a smear pattern is input to the timing controller.

The image analysis unit 33 detects weak pattern data, such as a shut-down pattern in which white data and black data alternate in vertical and horizontal directions, respectively, as shown in FIG. 9, and a smear pattern in which white data and black data alternate in a horizontal direction and vertical white stripes are formed as shown in FIG. 10. As suggested in Korean Patent Application No. 10-2008-0055419 (2008-06-12) filed by the present applicant, the image analysis unit 33 is able to detect the MSB 2 bits from 8-bit input digital video data and identify white data and black data according to the value of the MSB 2 bits. In this case, the white data is data close to high gray levels, for example, pixel data of R=192~255, G=192~255, and B=192~255. The black data is data close to low gray levels, for example, pixel data of R=0~63, G=0~63, and B=0~63.

The first selection unit 34 receives the first to third FRC patterns FRC1 to FRC3 through the I2C master 38 and supplies one of the FRC patterns to the FRC processing unit 30 in response to a control signal from the image analysis unit 33. When data other than weak pattern data is input, the first selection unit 34 selects the first FRC pattern FRC1 to supply it to the FRC processing unit 30 according to the control of the image analysis unit 33. When shut-down pattern data, as shown in FIG. 9, among the weak pattern data, is input, the first selection unit 34 selects the second FRC pattern FRC2 to supply it to the FRC processing unit 30 according to the control of the image analysis unit 33. When smear pattern data, as shown in FIG. 10, among the weak pattern data, is input, the second selection unit selects the third FRC pattern FRC3 to supply it to the FRC processing unit 30 according to the control of the image analysis unit 33.

The vertical/horizontal polarity control signal generator 35 generates polarity control signals V2, V4, H1, and H2 in response to vertical/horizontal polarity control data Dvh input through the I2C master 38. The first polarity control signal V2 is a vertical polarity control signal POL for inverting the polarity inversion cycle of data voltages charged in the vertically neighboring liquid crystal cells of the liquid crystal display panel 10 for every dot, which is a pulse signal of which logic is inverted every 2 horizontal periods. The second polarity control signal V4 is a vertical polarity control signal POL for inverting the polarity inversion cycle of data voltages charged in the vertically neighboring liquid crystal cells of the liquid crystal display panel 10 for every two dots, which is a pulse signal of which logic is inverted every 4 horizontal periods. The third polarity control signal H1 is a horizontal polarity control signal HINV for inverting the polarity inversion cycle of data voltages charged in the horizontally neighboring liquid crystal cells of the liquid crystal display panel 10 for every two dots, which is generated as a first logic, e.g., low logic. The fourth polarity control signal H2 is a horizontal polarity control signal HINV for inverting the polarity inversion cycle of data voltages charged in the horizontally neighboring cells of the liquid crystal display panel 10 for every four dots, which is generated as a second logic, e.g., high logic. A dot is the same as one liquid crystal cell. Accordingly, the inversion of polarity for every two dots as shown in FIG. 11 means that the polarity of the data voltages charged in the vertically or horizontally neighboring liquid crystal cells is inverted every two liquid crystal cells, and polarity inversion of every four dots means that the polarity of the data voltages charged in the vertically or horizontally neighboring liquid crystal cells is inverted every four liquid crystal cells.

When normal data other than weak pattern data and smear pattern data among the weak pattern data are input under the control of the image analysis unit 33 as shown in FIG. 11, the second selection unit 36 supplies the first polarity control signal V2 as the vertical polarity control signal POL to the data driving circuit 12. When shut-down pattern data among the weak pattern data is input under the control of the image analysis unit 33 as shown in FIG. 11, the second selection unit 36 supplies the second polarity control signal V4 as the vertical polarity control signal POL to the data driving circuit 12.

When normal data other than weak pattern data and shut-down pattern data among the weak pattern data are input under the control of the image analysis unit 33 as shown in FIG. 11, the third selection unit 37 supplies the third polarity control signal H1 as the horizontal polarity control signal HINV to the data driving circuit 12. When smear pattern data among the weak pattern data is input under the control of the image analysis unit 33 as shown in FIG. 11, the third selection unit 37 supplies the fourth polarity control signal H2 as the horizontal polarity control signal HINV to the data driving circuit 12.

The I2C master 38 transmits a serial clock SCL to the EEPROM 39 and supplies the vertical/horizontal control signal generator 35 with the FRC patterns FRC1 to FRC3 and vertical/horizontal polarity control data Dvh that are received from the EEPROM 39 via a serial data (SDA) bus. A LCD maker or TV set maker may update or add the FRC patterns FRC1 to FRC3 to be stored in the EEPROM 39 and the vertical/horizontal polarity control data Dvh according to the panel structure and weak pattern of the liquid crystal display panel 10.

Figure 4:
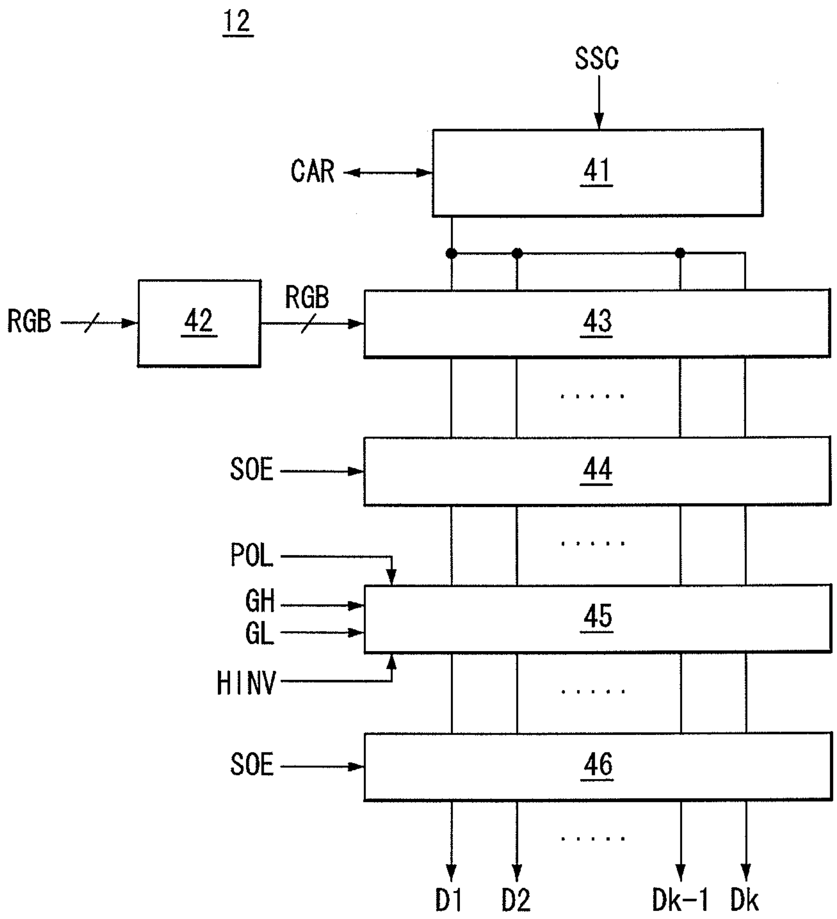
FIGS. 4 and 5 are equivalent circuit diagrams showing in detail a source drive IC of a data driving circuit shown in FIG. 1.
Figure 5:
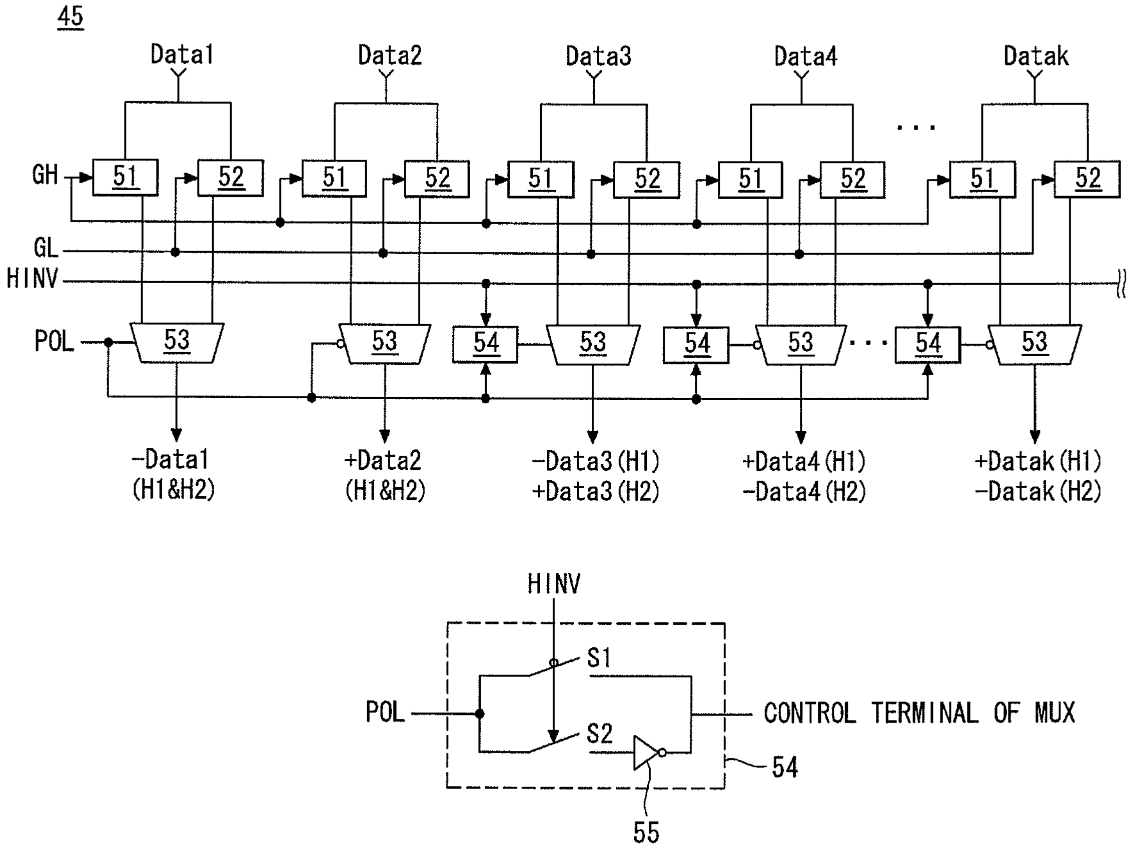

FIGS. 4 and 5 are equivalent circuit diagrams showing in detail a source drive IC of the data driving circuit 12 shown in FIG. 1.

Referring to FIGS. 4 and 5, the data driving circuit 12 includes a plurality of source drive ICs each of that drives k number of data lines D1 to Dk (where k is an integer less than m/2).

Each source drive IC includes a shift register 41, a data register 42, a first latch 43, a second latch 44, a digital/analog converter (hereinafter, referred to as "DAC") 45, and an output circuit.

The shift register 41 shifts the data sampling clock in accordance with the source sampling clock SSC from the timing controller 11. Further, the shift register 41 transmits a carry signal CAR to the shift register 41 of the next stage source drive IC. The data register 42 temporarily stores digital video data RGB from the timing controller 11 and supplies the stored data RGB to the first latch 43. The first latch 43 samples the digital video data RGB in response to the data sampling clock sequentially input from the shift register 41, latches the data RGB, and outputs the latched data RGB at the same time. The second latch 44 outputs the data RGB latched at the same time as the second latch 44 of other source drive ICs in response to the source output enable signal SOE after latching the data RGB input from the first latch 43.

As shown in FIG. 5, the DAC 45 includes a P-decoder 51 supplied with a positive gamma reference voltage GH, a N-decoder 52 supplied with a negative gamma reference voltage GL, a multiplexer that selects between the output of the P-decoder 51 and the output of the N-decoder 52 in response to the vertical polarity control signals POL, and a horizontal polarity inversion circuit 54 for inverting the output of the multiplexer 53 in response to the horizontal polarity control signals HINV. The P-decoder 51 decodes the digital video data RGB input from the second latch 44 to output a positive gamma compensation voltage corresponding to a gray level value of the data, and the N-decoder 52 decodes the digital video data RGB input from the second latch 44 to output a negative gamma compensation voltage corresponding to a gray level value of the data. The multiplexers 53 alternately select between the positive gamma compensation voltage and the negative gamma compensation voltage in response to the vertical polarity control signal POL and output the selected positive/negative gamma compensation voltage as the positive/negative analog video data voltage.

The multiplexers 53 include (4k+1)th and (4k+2)th multiplexers 53 (where k is a positive integer) that are directly controlled by the vertical polarity control signal POL and (4k+3)th and (4k+4)th multiplexers 53 that are controlled by the vertical polarity inversion circuit 54. The (4k+1)th multiplexers 53 alternately select between the output of the P-decoder 51 and the output of the N-decoder 52 in response to the vertical polarity control signals POL supplied to their non-inversion control terminals. The outputs of the (4k+1)th multiplexers 53 are data voltages to be supplied to the (4k+1)th data lines D1 and D5 in FIG. 2. The (4k+2)th multiplexers 53 alternately select between the output of the P-decoder 51 and the output of the N-decoder 52 in response to the vertical polarity control signals POL supplied to their non-inversion control terminals. The outputs of the (4k+2)th multiplexers 53 are data voltages to be supplied to the (4k+2)th data lines D2 and D6 in FIG. 2. The (4k+3)th multiplexers 53 alternately select between the output of the P-decoder 51 and the output of the N-decoder 52 in response to the output of the horizontal polarity inversion circuit 54 supplied to their non-inversion control terminals. The outputs of the (4k+3)th multiplexers 53 are data voltages to be supplied to the (4k+3)th data lines D3 and D7 in FIG. 2. The (4k+4)th multiplexers 53 alternately select between the output of the P-decoder 51 and the output of the N-decoder 52 in response to the output of the horizontal polarity inversion circuit 54 supplied to their non-inversion control terminals. The outputs of the (4k+4)th multiplexers 53 are data voltages to be supplied to the (4k+4)th data lines D4 and D8 in FIG. 2. A polarity inversion cycle of the outputs of the multiplexers 53 is determined according to the cycle of the vertical polarity control signal POL. For example, when the first polarity control signal V2, of which logic is inverted every 2 horizontal periods, is input as the vertical polarity control signal POL to the source drive ICs, the polarity of data voltages output from the multiplexers 53 is inverted every 2 horizontal periods. When the second polarity control signal V4, of which logic is inverted every 4 horizontal periods, is input as the vertical polarity control signal POL to the source drive ICs, the polarity of data voltages output from the multiplexers 53 is inverted every 4 horizontal periods.

The horizontal polarity inversion circuit 54 includes switching elements S1 and S2 and an inverter 55. The horizontal polarity control circuit 54 controls the logic value of the control signal supplied to the non-inversion control terminals of the (4k+3)th multiplexers 53 and the non-inversion control terminals of the (4k+4)th multiplexers 53. An input terminal of the first switching element S1 is connected to a vertical polarity control signal supply line for supplying the vertical polarity control signal POL, and an output terminal of the first switching element S1 is connected to the inversion/non-inversion control terminals of the (4k+3)th or (4k+4)th multiplexers 53. The inversion control terminal of the first switching element S1 is connected to a horizontal polarity control signal supply line for supplying the horizontal polarity control signal. An input terminal of the second switching element S2 is connected to the vertical polarity control signal supply line, and an output terminal of the second switching element S2 is connected to the inverter 55. The non-inversion control terminal of the second switching element S2 is connected to the horizontal polarity control signal supply line for supplying the horizontal polarity control signal. The inverter 55 is connected between the output terminal of the second switching element S2 and the non-inversion control terminals of the (4k+4)th multiplexers 53.

When the third polarity control signal H1, that is generated by a first logic (or low logic), is input as the horizontal polarity control signal HINV to the source drive ICs, the horizontal polarity inversion circuit 54 supplies the vertical polarity control signal POL as it is to the inversion/non-inversion control terminals of the multiplexers 53 through the first switching element S1 and controls the horizontal polarity inversion cycle of the data voltages charged in the liquid crystal cells of the liquid crystal display panel 10 for every two dots. At this time, the horizontal polarity of the data voltages output from the source drive ICs is inverted like '−+−+', that is, every output channel. However, as the data lines connected to the output channels supply data voltages to the left and right neighboring liquid crystal cells, the horizontal polarity inversion cycle of the data voltages charged in the liquid crystal cells of the liquid crystal display panel 10 is inverted for every two dots.

When the fourth polarity control signal H2, that is generated by a second logic (or high logic), is input as the horizontal polarity control signal HINV to the source drive ICs, the horizontal polarity inversion circuit 54 inverts the vertical polarity control signal POL and supplies it to the inversion/non-inversion control terminals of the multiplexers 53 through the second switching element S2 and the inverter 55, and controls the horizontal polarity inversion cycle of the data voltages charged in the liquid crystal cells of the liquid crystal display panel 10 for every two dots. At this time, the horizontal polarity of the data voltages output from the source drive ICs is inverted like '−++−', that is, every two output channels. However, as the data lines connected to the output channels supply data voltages to the left and right neighboring liquid crystal cells, the horizontal polarity inversion cycle of the data voltages charged in the liquid crystal cells of the liquid crystal display panel 10 is inverted for every four dots.

The output circuit 46 short-circuits neighboring data output channels in a high-logic period of the source output enable signal SOE, and thus outputs a mean voltage of neighboring data voltages to supply a charge share voltage to the data lines D1 to Dk through an output buffer, and then supplies positive/negative analog video data voltages +Data1 to −Datak to the data lines D1 to Dk. Also, the output circuit 46 may supply a common voltage Vcom, instead of the charge share voltage, to the data lines D1 to Dk through the output buffer in the high logic period of the source output enable signal SOE and then supply positive/negative analog video data voltages to the data lines D1 to Dk.

Figure 6:
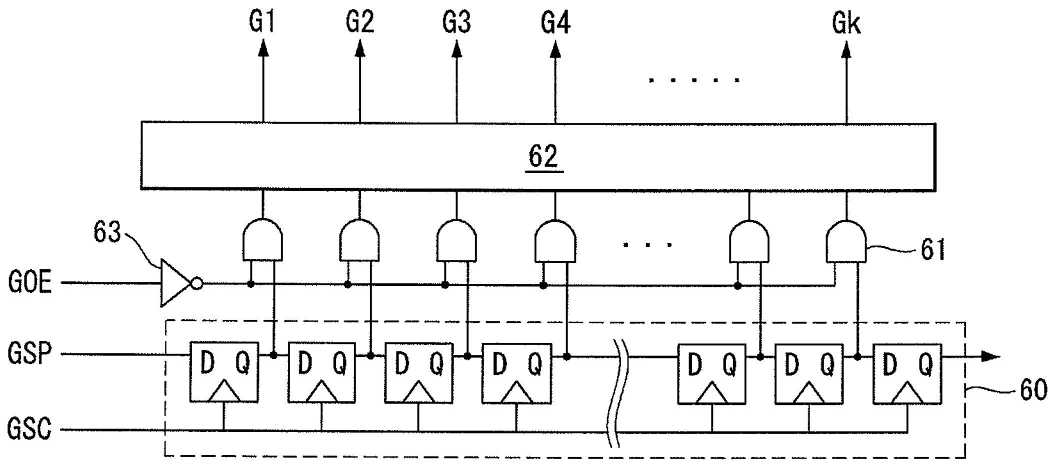
FIG. 6 is a circuit diagram showing in detail a gate driving circuit shown in FIG. 1.

FIG. 6 is a circuit diagram showing in detail the gate driving circuit 13.

Referring to FIG. 6, the gate driving circuit 13 includes a plurality of gate drive ICs for sequentially supplying gate pulses synchronized with data voltages supplied to the data lines D1 to Dm/2 to the gate lines G1 to Gn.

Each gate drive IC includes a shift register 60, a level shifter 62, a plurality of logical multiply gates (hereinafter, "AND gates") 61 connected between the shift register 60 and the level shifter 62, and an inverter 63 for inverting the gate output enable signal GOE.

The shift register 60 sequentially shifts the gate start pulse GSP in accordance with the gate shift clock GSC by using a plurality of dependently connected D flip-flops. Each AND gate 61 generates an output by logically multiplying an output signal of the shift register 60 and an inversion signal of the output enable signal GOE. The inverter 63 inverters the gate output enable signal GOE and supplies it to the AND gates 61.

The level shifter 62 shifts the swing width of the output voltage of the AND gates 61 into a swing width that is suitable for driving the TFTs formed on the pixel array of the liquid crystal display panel 10. The output signals, i.e., gate pulses, of the level shifter 62 are sequentially supplied to the gate lines G1 to Gk.

The shift register 60 may be formed simultaneously along with the pixel array on a glass substrate in a manufacturing process of the pixel array of the liquid crystal display panel 10. In this case, the level shifter 62 is not formed on the glass substrate but may be mounted on a control board along with the timing controller 11 or mounted on a source printed circuit board along with the source drive ICs.

Figure 7:
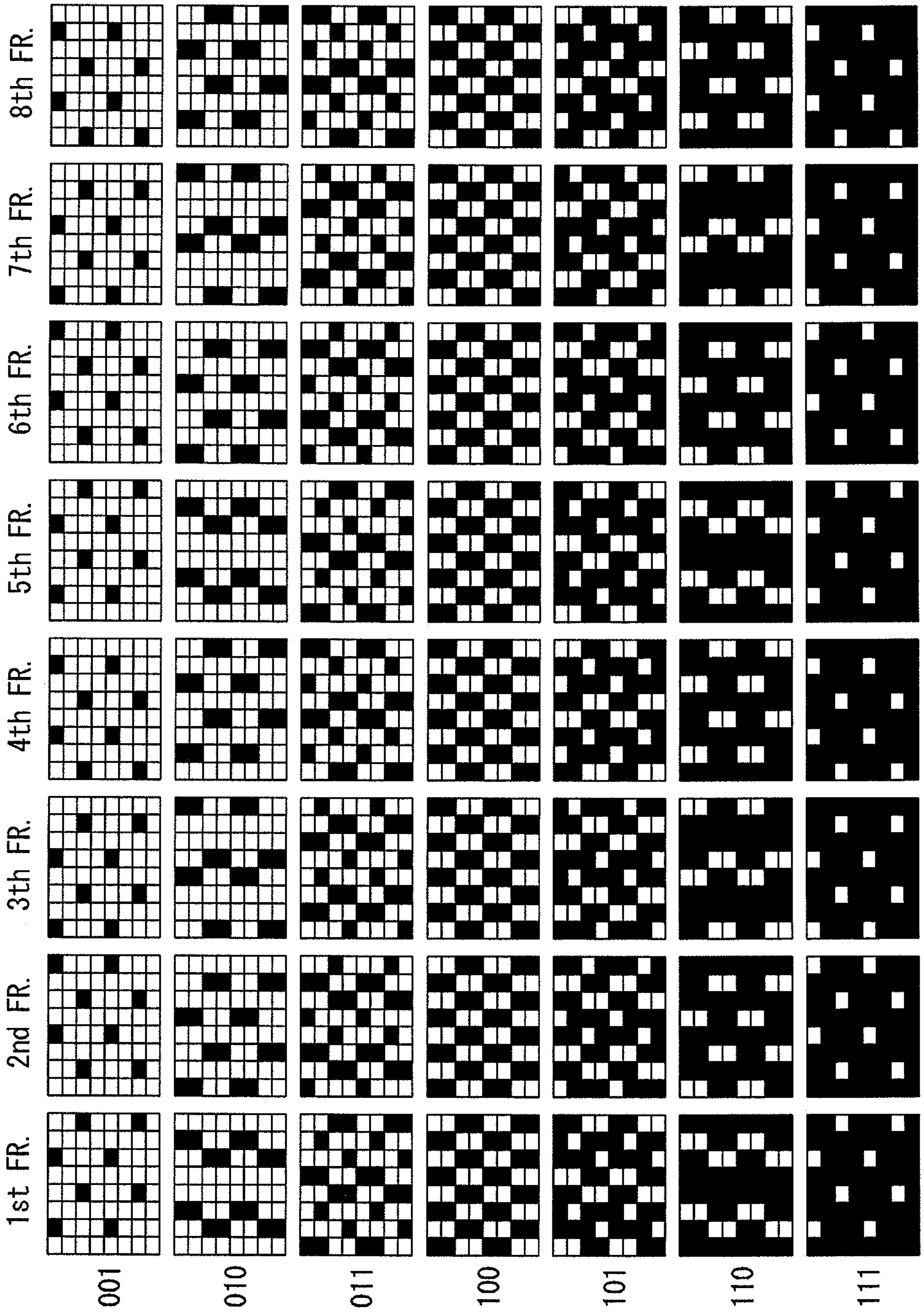
FIG. 7 is a view showing one example of a first FRC pattern.

FIG. 7 is a view showing one example of the first FRC pattern FRC1.

Referring to FIG. 7, the first FRC pattern FRC1 includes FRC data of a ⅛ gray scale (001), FRC data of a 2/8 gray scale (010), FRC data of a ⅜ gray scale (011), FRC data of a 4/8 gray scale (100), FRC data of a ⅝ gray scale (101), FRC data of a 6/8 gray scale (110), and FRC data of a ⅞ gray scale (111). For the FRC data of the ⅛ gray scale (001), a correction value of '1' is allocated to one pixel data per eight pixels. For the FRC data of the 2/8 gray scale (010), a correction value of '1' is allocated to two pixel data per eight pixels. For the FRC data of the ⅜ gray scale (011), a correction value of '1' is allocated to three pixel data per eight pixels. For the FRC data of the 4/8 gray scale (100), a correction value of '1' is allocated to four pixel data per eight pixels. For the FRC data of the ⅝ gray scale (101), a correction value of '1' is allocated to five pixel data per eight pixels. For the FRC data of the 6/8 gray scale (110), a correction value of '1' is allocated to six pixel data per eight pixels. For the FRC data of the ⅞ gray scale (111), a correction value of '1' is allocated to seven pixel data per eight pixels. If a pixel position to which a correction value of '1' is added is identical for each frame, FRC artifacts that make pixels to which the correction value is added bright may be seen on the display screen. To avoid such FRC artifacts, a pixel position of the FRC data of each gray scale to which the correction value of '1' is allocated is changed in the next frame period, and the pixel position to which the correction value of '1' is allocated is repeated every 8 frame periods. In FIG. 7, white represents pixels to which no correction value is added, and black represents pixels to which a correction value is added.

The second and third FRC data FRC2 and FRC3 also include FRC data of a ⅛ gray scale (001), FRC data of a 2/8 gray scale (010), FRC data of a ⅜ gray scale (011), FRC data of a 4/8 gray scale (100), FRC data of a ⅝ gray scale (101), FRC data of a 6/8 gray scale (110), and FRC data of a ⅞ gray scale (111). Also, in the second and third FRC data FRC2 and FRC3, a pixel position of the FRC data of each gray scale to which the correction value of '1' is allocated is changed in the next frame period, like in the first FRC data FRC1, and the pixel position to which the correction value of '1' is allocated is repeated every 8 frame periods. In each of the second and third FRC patterns FRC2 and FRC3, a pixel position to which the correction value of '1' is set differently for each frame from the first FRC pattern FRC1. In the second FRC pattern FRC2, the pixel position to which a correction value is added is determined such that a correction value is to be added to a white data position of the shut-down pattern shown in FIG. 9, and the polarity balance has to be kept. The second FRC pattern FRC2 is designed differently from the first FRC pattern FRC1 by changing the order of the FRC patterns for each frame and the pixel position to which a correction value is added in the first FRC pattern FRC1 in consideration of the white data position of the shut-down pattern on the basis of the first FRC pattern FRC1. In the third FRC pattern FRC3, the pixel position to which the correction value is added is determined such that a correction value is to be added to a white data position of the smear pattern shown in FIG. 10, and the polarity balance has to be kept. The third FRC pattern FRC3 is designed differently from the first and second FRC patterns FRC1 and FRC2 by changing the order of the FRC patterns for each frame and the pixel position to which the correction value is added in the first FRC pattern FRC1 in consideration of the white data position of the smear pattern on the basis of the first FRC pattern FRC1.

Figure 8:
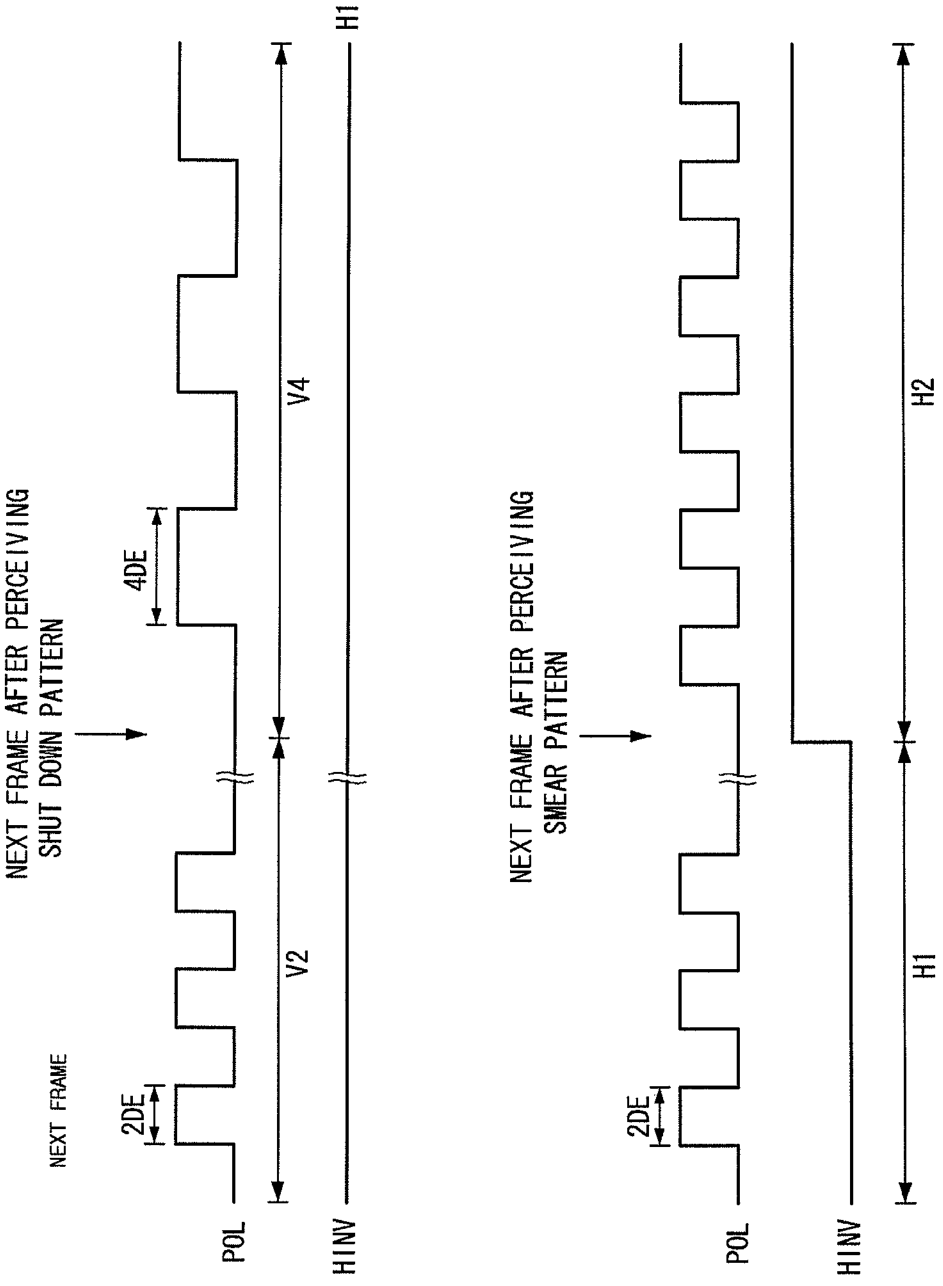
FIG. 8 is a waveform diagram showing changes in the vertical polarity control signal and the horizontal polarity control signal when a weak pattern is input to the timing controller.

FIG. 8 is a waveform diagram showing changes in the vertical polarity control signal POL and the horizontal polarity control signal HINV when a weak pattern is input to the timing controller 11. FIG. 9 is a waveform diagram showing changes in the polarity patterns of data voltages supplied to the liquid crystal display panel 10 when a shut-down pattern is input to the timing controller 11. FIG. 10 is a view showing changes in the polarity patterns of data voltages supplied to the liquid crystal display panel 10 when a smear pattern is input to the timing controller 11. FIG. 11 is a view showing the polarity control signals POL and HINV and FRC patterns FRC1 to FRC3 that are output from the timing controller 11 according to data input to the timing controller 11 and the polarity patterns of the data voltages of the liquid crystal display panel 10.

Referring to FIGS. 8 to 11, when data other than weak pattern data is input, the timing controller 11 selects the vertical polarity control signal POL as the first polarity control signal V2 of which logic is inverted every 2 horizontal periods (2DE) and selects the horizontal polarity control signal HINV as the third polarity control signal H1 generated as a first logic, thereby controlling the data driving circuit 12. In FIG. 8, 'DE' is one period of a data enable signal, and the one period of the data enable signal corresponds to one horizontal period that is substantially same as one period of a horizontal synchronization signal Hsync. The data driving circuit 12 supplies data voltages of which polarity is inverted every 2 horizontal periods to the data lines D1 to Dm/2 in response to the first polarity control signal V2. Also, the data driving circuit 12 differently controls the polarity of data voltages supplied to the odd-numbered data lines D1, D3, . . . , Dm/2−1 and the polarity of data voltages supplied to the even-numbered data lines D2, D4, . . . , Dm/2 in response to the third polarity control signal H1. In this manner, by virtue of the data voltages supplied to the data lines D1 to Dm/2, the polarity of the data voltages charged in the vertically neighboring liquid crystal cells, among the liquid crystal cells of the liquid crystal display panel 10, is inverted for every dot (V1Dot), and the polarity of the data voltages charged in the horizontally neighboring liquid crystal cells is inverted for every two dots (H2Dot) as shown in FIG. 11.

When a weak pattern, such as the shut-down pattern shown in FIG. 9 or the smear pattern shown in FIG. 10, is input to the timing controller 11, the timing controller 11 detects the weak pattern data and changes the logic inversion cycle of the vertical polarity control signal POL or inverts the logic of the horizontal polarity control signal HINV.

As shown in FIG. 9, when data voltages of the shut-down pattern in which white data and black data alternate in vertical and horizontal directions are supplied to the liquid crystal display panel 10, if the polarity of the data voltages is inverted in the V1Dot and H2Dot fashion, the vertical polarity is dominant as shown in the left part of FIG. 9. Therefore, a specific color looks bright in the display image and a flicker appears, thereby degrading the picture quality. To prevent this problem, when the smear pattern is input, the timing controller 11 expands the logic inversion cycle of the vertical polarity control signal POL in order to keep the balance between positive and negative data voltages supplied to the liquid crystal display panel 10 as shown in the right part of FIG. 9.

When the shut-down pattern shown in FIG. 9 is input to the timing controller 11, the timing controller 11 selects the vertical polarity signal POL as a second polarity control signal V4 of which logic is inverted every 4 horizontal periods (4DE), and maintains the horizontal polarity control signal HINV as the third polarity control signal H1. The data driving circuit 12 supplies data voltages of which polarity is inverted every 4 horizontal periods to the data lines D to Dm/2 in response to the second polarity control signal V4. Also, the data driving circuit 12 differently controls the polarity of data voltages supplied to the odd-numbered data lines D1, D3, . . . , Dm/2−1 and the polarity of data voltages supplied to the even-numbered data lines D2, D4, . . . , Dm/2 in response to the third polarity control signal H1. In this manner, by virtue of the data voltages supplied to the data lines D1 to Dm/2, the polarity of the data voltages charged in the vertically neighboring liquid crystal cells, among the liquid crystal cells of the liquid crystal display panel 10, is inverted for every two dots (V2Dot), and the polarity of the data voltages charged in the horizontally neighboring liquid crystal cells is inverted for every two dots (H2Dot) as shown in FIGS. 9 and 11.

As shown in FIG. 10, when data voltages of the smear pattern in which white data and black data are input in a stripe pattern are supplied to the liquid crystal display panel 10, if the polarity of the data voltages is inverted in the V1Dot and H2Dot fashion, the horizontal polarity is dominant as shown in the upper part of FIG. 10. Therefore, horizontal stripes and flicker appear in the display image, thereby degrading the picture quality. To prevent this problem, when the smear pattern data is input, the timing controller 11 inverts the logic of the horizontal polarity control signal HINV in order to keep the balance between positive and negative data voltages supplied to the liquid crystal display panel 10 as shown in the lower part of FIG. 10.

When the smear pattern shown in FIG. 10 is input to the timing controller 11, the timing controller 11 maintains the vertical polarity control signal POL as the first polarity control signal V2, and selects the horizontal polarity control signal HINV as the fourth polarity control signal H2. The data driving circuit 12 supplies data voltages of which polarity is inverted every 2 horizontal periods to the data lines D to Dm/2 in response to the first polarity control signal V2. Also, the data driving circuit 12 inverts the polarity of the data voltages supplied to the data lines D1 to Dm/2 for every four data lines in response to the fourth polarity control signal H2 to expand the horizontal polarity inversion cycle of the data voltages. In this manner, by virtue of the data voltages supplied to the data lines D1 to Dm/2, the polarity of the data voltages charged in the vertically neighboring liquid crystal cells, among the liquid crystal cells of the liquid crystal display panel 10, is inverted for every dot (V1Dot), and the polarity of the data voltages charged in the horizontally neighboring liquid crystal cells is inverted for every four dots (H4Dot) as shown in FIGS. 10 and 11.

As described above, the liquid crystal display according to the exemplary embodiment of the present invention can display images with gray levels more than the number of gray levels of input data while driving a liquid crystal display panel with data having a smaller number of bits than that of the input data, and can reduce the number of output channels of a data driving circuit by supplying data voltages to left and right liquid crystal cells via one data line. Furthermore, the liquid crystal display according to the exemplary embodiment of the present invention can change the vertical polarity inversion cycle or horizontal polarity inversion cycle of data voltages charged in the liquid crystal cells of the liquid crystal display panel when weak pattern data is input, thereby preventing the degradation of the picture quality in any data pattern.

From the foregoing description, those skilled in the art will readily appreciate that various changes and modifications can be made without departing from the technical idea of the present invention. Therefore, the technical scope of the present invention is not limited to the contents described in the detailed description of the specification but defined by the appended claims.

The invention claimed is:

1. A liquid crystal display, comprising:

a liquid crystal display panel including a plurality of data lines, an n-number of gate lines crossing the data lines, a plurality of TFTs connected to the crossings of the data lines and the gate lines, and liquid crystal cells connected to the TFTs and arranged in an m×n matrix, wherein the m and n are natural numbers;

a data driving circuit that converts digital video data into positive/negative data voltages to be supplied to the data lines in response to a vertical polarity control signal and adjusts the horizontal polarity inversion cycle of the positive/negative data voltages in response to a horizontal polarity control signal; and a timing controller that generates the vertical polarity control signal and the horizontal polarity control signal, adds a frame rate control (FRC) correction value to input digital video data to supply the input digital video data to the data driving circuit, detects a predetermined weak pattern from the input digital video data and, when data having the weak pattern is detected, changes either the logic inversion cycle of the vertical polarity control signal or the logic of the horizontal polarity control signal and changes the position of the data to which the FRC correction value is added, wherein the weak pattern data includes data having a first weak pattern in which white data and black data alternate in vertical and horizontal directions, respectively, of the liquid crystal display panel; and data having a second weak pattern in which the white data and the black data form a stripe pattern, and wherein the timing controller comprises:

a bit expansion unit that expands the number of bits of i-bit digital video data, i being a natural number of 6 or more;

a FRC processing unit that adds the FRC correction value to the MSB i-j bits data in the digital video data expanded by the bit expansion unit to supply j-bit digital video data to the data driving circuit, j being a natural number less than i;

an image analysis unit that detects first and second weak pattern data by analyzing the input digital video data;

a first selection unit that receives first to third FRC patterns designated with different positions of the data to which the FRC correction value is added, and, under the control of the image analysis unit, supplies the first FRC pattern to the FRC processing unit upon receipt of data other than the weak pattern data, supplies the second FRC pattern to the FRC processing unit upon receipt of the first weak pattern data, and supplies the third FRC pattern to the FRC processing unit upon receipt of the second weak pattern data.

2. The liquid crystal display of claim 1, wherein the number of the data lines is m/2, and the data driving circuit time-divisionally supplies same data lines with the positive/negative data voltages of two colors to be charged in liquid crystal cells neighboring in a left and right.

3. The liquid crystal display of claim 1, wherein the timing controller further comprises:

a vertical/horizontal polarity control signal generator that generates, in response to vertical/horizontal polarity control data, a first polarity control signal including pulses of which logic is inverted every 2 horizontal periods, a second polarity control signal including pulses of which logic is inverted every 4 horizontal periods, a third polarity control signal of a first logic, and a fourth polarity control signal of a second logic;

a second selection unit that selects, under the control of the image analysis unit, the first polarity control signal as the vertical polarity control signal upon receipt of data other than the first weak pattern data and the second polarity control signal as the vertical polarity control signal upon receipt of the first weak pattern data;

a third selection unit that selects, under the control of the image analysis unit, the third polarity control signal as the horizontal polarity control signal upon receipt of data other than the second weak pattern data and the fourth polarity control signal as the horizontal polarity control signal upon receipt of the second weak pattern data; and an I2C master that, through an I2C communication protocol, receives the FRC patterns from an EEPROM to supply the FRC patterns to the first selection unit and receives the vertical/horizontal polarity control data from the EEPROM to supply the vertical/horizontal polarity control data to the vertical/horizontal polarity control signal generator.

4. The liquid crystal display of claim 3, wherein, when data other than the weak pattern data is displayed on the liquid crystal display panel, the negative/positive data voltages charged in the liquid crystal cells of the liquid crystal display panel have a polarity pattern of vertical one-dot and horizontal two-dot inversion type.

5. The liquid crystal display of claim 3, wherein, when the first weak pattern data is displayed on the liquid crystal display panel, the negative/positive data voltages charged in the liquid crystal cells of the liquid crystal display panel have a polarity pattern of vertical two-dot and horizontal two-dot inversion type.

6. The liquid crystal display of claim 3, wherein, when the second weak pattern data is displayed on the liquid crystal display panel, the negative/positive data voltages charged in the liquid crystal cells of the liquid crystal display panel have a polarity pattern of vertical one-dot and horizontal four-dot inversion type.

* * * * *